(12) United States Patent
Nakamura et al.

(10) Patent No.: US 7,352,534 B2
(45) Date of Patent: Apr. 1, 2008

(54) FLEXURE LEG OPTIMIZATION SHAPES FOR LATERAL STIFFNESS

(75) Inventors: Shigeo Nakamura, Kanagawa-ken (JP); Victor Wing Chun Shum, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 445 days.

(21) Appl. No.: 11/056,595

(22) Filed: Feb. 11, 2005

(65) Prior Publication Data

US 2006/0181810 A1 Aug. 17, 2006

(51) Int. Cl.
*G11B 21/16* (2006.01)

(52) U.S. Cl. .................................... 360/245.3

(58) Field of Classification Search ............... 360/245, 360/245.3, 245.7, 245.9; 29/603.06
See application file for complete search history.

(56) References Cited

U.S. PATENT DOCUMENTS

| | | | |
|---|---|---|---|
| 3,701,610 A | 10/1972 | Buslik et al. | |
| 5,282,103 A | 1/1994 | Hatch et al. | |
| 5,377,064 A | 12/1994 | Yaginuma et al. | |
| 5,461,525 A | 10/1995 | Christianson et al. | |
| 5,771,136 A | 6/1998 | Girard | |
| 5,856,896 A | 1/1999 | Berg et al. | |
| 5,875,071 A | 2/1999 | Erpelding et al. | |
| 5,943,190 A | 8/1999 | Fanslau, Jr. | |
| 6,288,875 B1 * | 9/2001 | Budde | 360/245.3 |
| 6,480,459 B2 | 11/2002 | Budde | |
| 6,710,978 B2 | 3/2004 | Holaway et al. | |
| 6,714,384 B2 | 3/2004 | Himes et al. | |
| 6,735,051 B2 * | 5/2004 | Zeng et al. | 360/245.7 |
| 6,741,426 B2 | 5/2004 | Girard | |
| 6,757,137 B1 * | 6/2004 | Mei | 360/245.7 |
| 2002/0027747 A1 * | 3/2002 | Budde | 360/245.7 |
| 2004/0008449 A1 | 1/2004 | Girard | |
| 2004/0027725 A1 | 2/2004 | Pan et al. | |
| 2005/0044698 A1 * | 3/2005 | Childers et al. | 29/603.06 |
| 2005/0047023 A1 * | 3/2005 | Childers et al. | 360/245.9 |

FOREIGN PATENT DOCUMENTS

JP 63204509 8/1988

* cited by examiner

*Primary Examiner*—Tianjie Chen
(74) *Attorney, Agent, or Firm*—Duke Amaniampong

(57) ABSTRACT

Embodiments of the present invention include A head suspension assembly for a data storage device comprising a load beam and a Femto flexure coupled to the load beam, wherein the Femto flexure is a laminate structure comprising a support layer, the flexure comprising a plurality of symmetrical flexure legs, each of the flexure legs substantially hourglass shaped.

15 Claims, 4 Drawing Sheets

300A

Shape 1

300B

Shape 2

FLEXURE LEG OPTIMIZATION SHAPES FOR LATERAL STIFFNESS

FIELD OF THE INVENTION

The present invention relates to transducer suspension systems and more particularly to a laminated suspension having improved lateral stiffness.

BACKGROUND OF THE INVENTION

Disk drives are information storage devices that utilize at least one rotatable disk with concentric data tracks containing the information, a transducer (or head) for reading data from or writing data to the various tracks, and a transducer positioning actuator connected to the transducer for moving it to the desired track and maintaining it over the track during read and write operations. The transducer is attached to a slider, such as an air-bearing slider, which is supported adjacent to the data surface of the disk by a cushion of air generated by the rotating disk. The transducer can also be attached to a contact-recording type slider. In either case, the slider is connected to a support arm of the transducer-positioning actuator by means of a suspension.

The suspension must meet several requirements. The suspension must be flexible and provide a bias force in the vertical direction. This is necessary to provide a compensating force to the lifting force of the air bearing in order to keep the slider at the correct height above the disk. Also, vertical flexibility is needed to allow the slider to be loaded and unloaded away from the disk. Another requirement of the suspension is that it must provide a pivotal connection for the slider. Irregularities in operation may result in misalignment of the slider. The slider is able to compensate for these problems by pitching and/or rolling slightly to maintain the proper orientation necessary for the air bearing. Another requirement of the suspension is that it must be rigid in the lateral direction. This is needed to prevent the head from moving side to side, which would result in the head reading the wrong track. Rigidity is also required to maintain slider position during high lateral shock events such as crash stop so that it does not slam into other parts of a disk drive.

As disk drives have become smaller in size, the recorded track density has increased dramatically. This has necessitated the use of smaller and smaller heads and suspensions. However, these smaller geometries of the suspension and head make manufacture much more difficult. In particular, when moving from a Pico slider to a Femto slider, flexure pitch and roll stiffness and suspension spring rate have been reduced significantly. At the same time it is desirable to continue to use the same Stainless Steel thickness for a Femto flexure as for a Pico flexure due to proven manufacture yield. As a result, it is difficult to maintain acceptable lateral stiffness of the flexure. What is needed is a suspension design and method of manufacture that lends itself to reduced pitch and roll stiffness while simultaneously maintaining acceptable lateral stiffness.

SUMMARY OF THE INVENTION

Embodiments of the present invention include a head suspension assembly for a data storage device comprising a load beam, a hinge, a base plate and a Femto flexure, wherein the Femto flexure is a laminate structure comprising a support layer, the flexure comprising a plurality of symmetrical flexure legs, each of the flexure legs substantially hourglass shaped. Since the embodiments apply to the heavy load-bearing layer of the flexure, which is currently the steel layer, they can as easily be applied to other flexure types including CIS, ILS, CAPS, FOS, etc. They can even be implemented on a wired suspension.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Reference will now be made in detail to embodiments of the present invention, a system and method for striping data, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
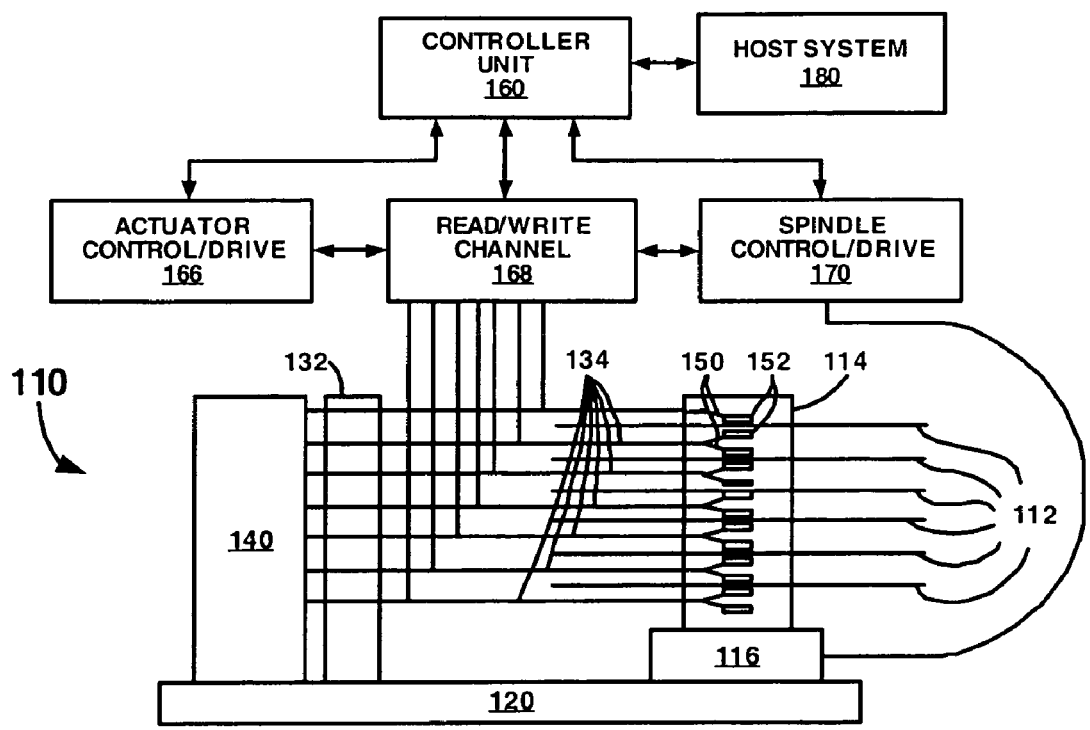
FIG. 1 is a side view of a disk drive system and a controller unit in block form in accordance with embodiments of the present invention.
Figure 2:
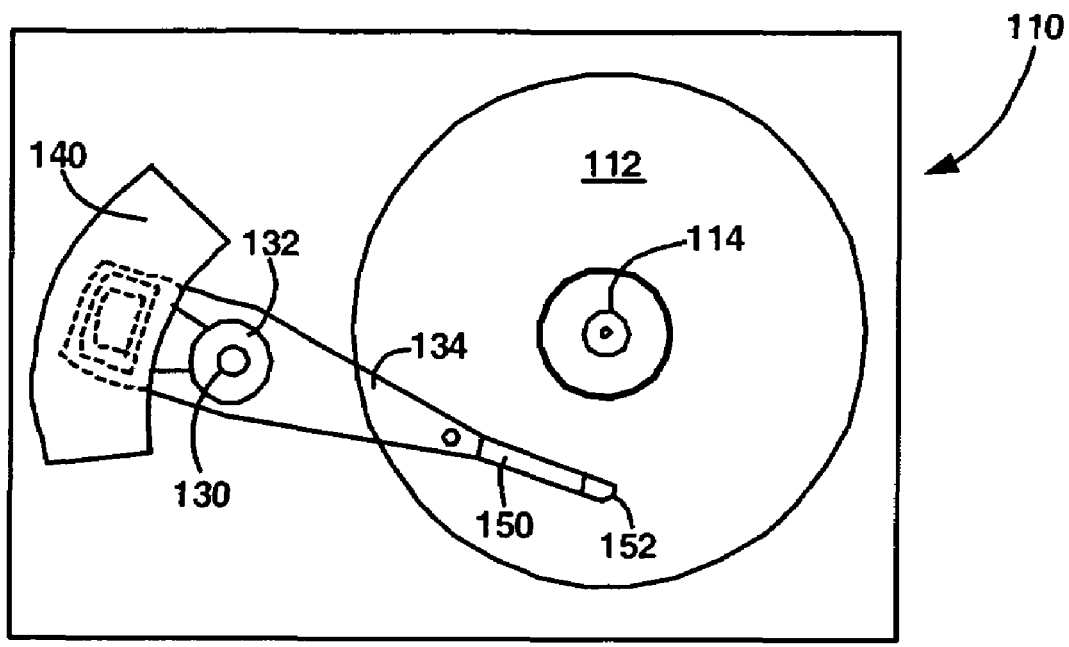
FIG. 2 is a top view of one disk drive system in accordance with embodiments of the present invention.

FIGS. 1 and 2 show a side and a top view, respectively, of a disk drive system designated by the general reference number 110. The disk drive system 110 comprises a plurality of stacked magnetic recording disks 112 mounted to a spindle 114. The disks 112 may be conventional particulate or thin film recording disks or, in other embodiments, they may be liquid bearing disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of suspension assemblies 150 are attached to the actuator arms 134. A plurality of transducer heads, or sliders 152 are attached respectively to the suspension assemblies 150. The sliders 152 are located proximate to the disks 112 so that, during operation, they are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

When moving from a Pico slider to a Femto slider, the pitch and roll stiffness of a suspension are reduced generally as much as fifty percent or more from the Pico requirements. In order to do so, new laminates could be designed to achieve the desired pitch and roll characteristics. However, as a result, the lateral stiffness is compromised. In addition, the development of new laminates (e.g., 15-10-12 stainless steel-polyimide-copper) laminate results in unknown yields and could cause production problems when working with the new material.

Figure 3:
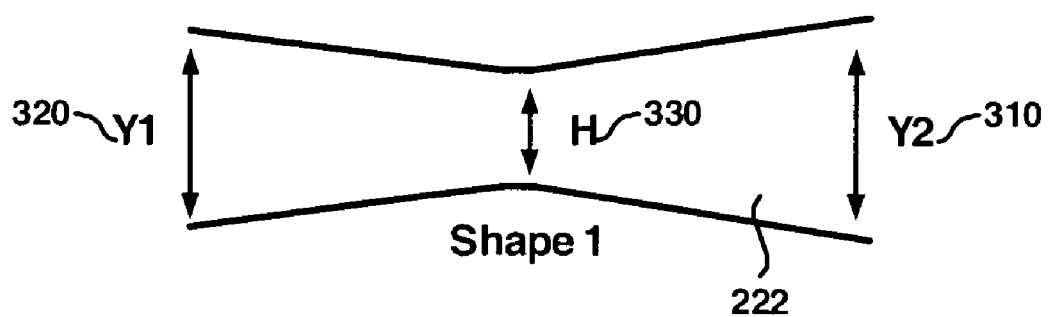
FIG. 3 is an illustration of exemplary flexure leg shapes in accordance with embodiments of the present invention.
Figure 3:
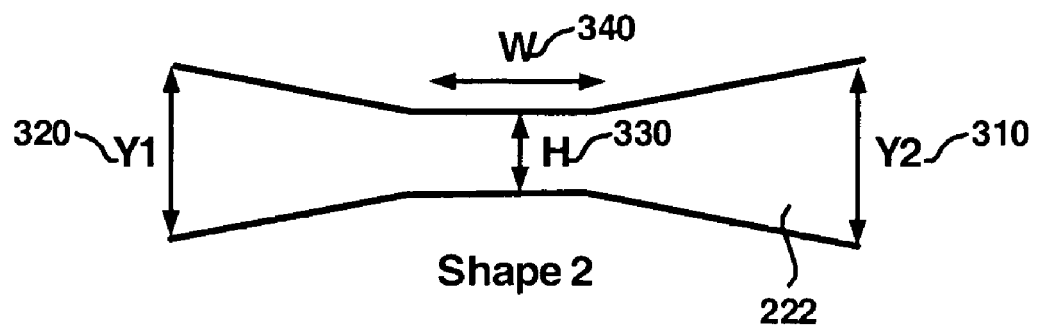
Figure 4:
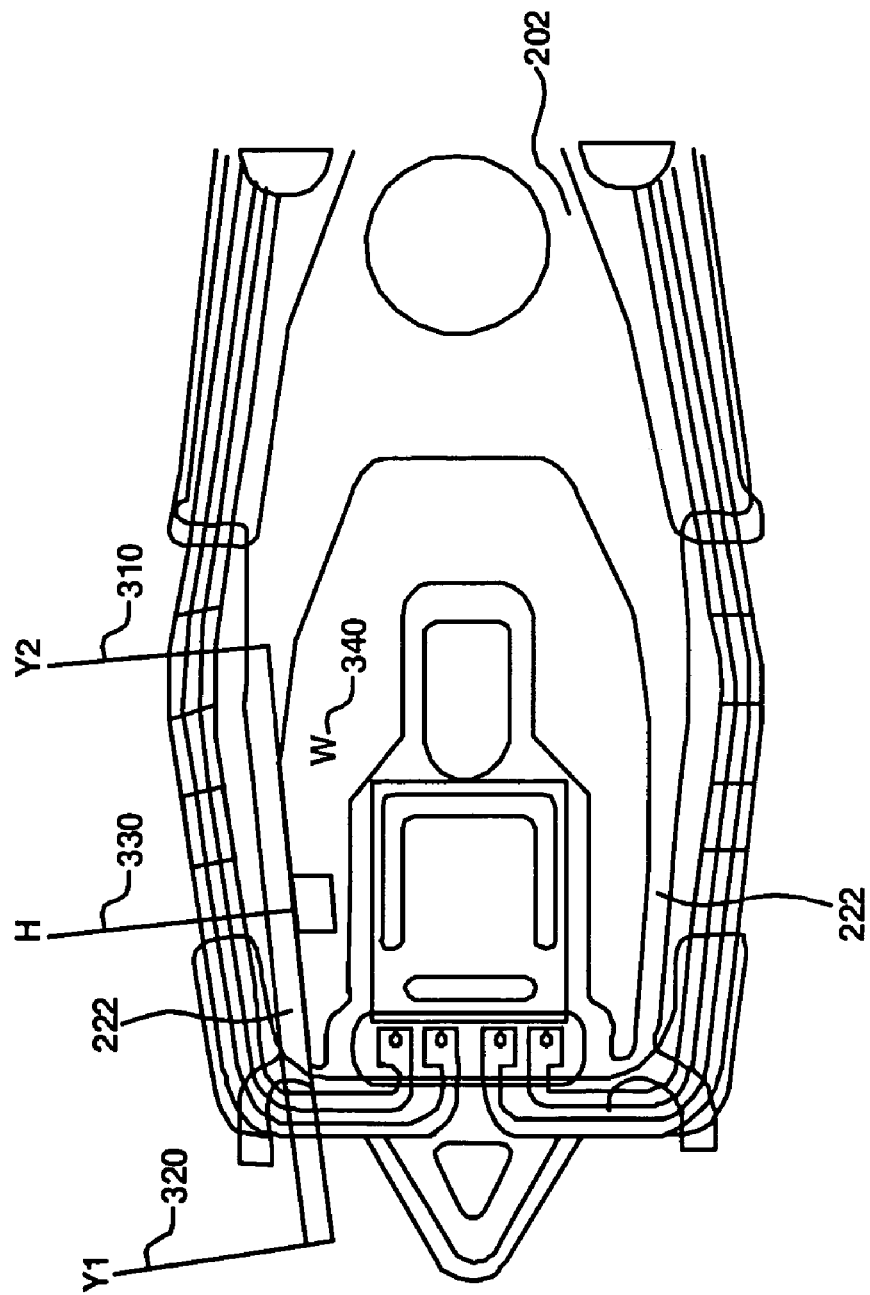
FIG. 4 is a top view of suspension assembly with an exemplary flexure leg shape in accordance with embodiments of the present invention.

Embodiments of the present invention use a mass production laminate (20-10-12 stainless steel-polyimide-copper) with known yields. To achieve the desired pitch and roll stiffness that is required of a Femto slider, the stainless steel flexure legs are longer than the flexure legs of a Pico slider and use a novel flexure leg shape of the present invention to maintain a desired lateral stiffness. FIGS. 3 and 4 illustrate novel shapes of the flexure legs in accordance with embodiments of the present invention.

The present invention improves lateral stiffness of the flexure legs and keeps the pitch and roll stiffness essentially unchanged. The present invention enables the design of a Femto flexure using a thicker laminates such as 20-10-12 stainless steel-polyimide-copper with low enough pitch and roll stiffness. Simultaneously, the novel flexure leg shape of the present invention improves lateral stiffness of the flexure so that it does not fall below the minimum requirements.

FIG. 3 is an illustration of exemplary flexure leg shapes in accordance with embodiments of the present invention. Shape one 300A illustrates an exemplary flexure leg shape comprising a first width taper Y1 320, a mid section of minimal width and height H 330 and second width taper Y2 310. In one embodiment of the invention, shape one 300A is approximately an hourglass shape with a mid section width H 330. In one embodiment of the invention, the first width taper Y1 320 linearly tapers from the left side towards the mid section H 330 where the first taper Y1 320 meets a second taper Y2 310. In another embodiment of the invention, the second taper Y2 310 linearly decreases from the right to the mid section H 330 and intersects Y1 320 at midsection H 330. Although the tapers are shown as linear, it is understood that they can also be curved.

In one embodiment of the invention, midsection of minimal width and height H 330 is the narrowest width of the flexure leg. In one embodiment of the invention, the first taper Y1 320 changes width at the same rate as Y2 310. In another embodiment of the invention, the rate of taper between Y1 320 and Y2 310 is different. In one embodiment of the invention, shape one 300A can be manufactured from a laminate comprising 20-micron thick stainless steel and can be used in a Femto flexure. Shape one 300A, even when made from conventional laminate comprising 20 micron thick stainless steel (conventionally used for manufacture of Pico flexures) provides the necessary pitch and roll stiffness while maintaining the correct lateral stiffness for Femto flexures.

Shape two 300B illustrates an exemplary flexure leg shape comprising a first width taper Y1 320, a mid section of height H 330 with a width W 340 and a second width taper Y2 310. In one embodiment of the invention, shape one 300B is approximately an hourglass shape with a mid section comprising width H 330 and height H 330. In one embodiment of the invention, the midsection of shape two 300B is approximately rectangular. In one embodiment of the invention, the first width taper Y1 320 linearly tapers from the left side towards the mid section of height H 330 and width W 340 where the first taper Y1 320 and the second taper Y2 310 meet at the midsection of width 340 and height 330.

In one embodiment of the invention, midsection dimension H 330 is the narrowest width of the flexure leg. In one embodiment of the invention, the first taper Y1 320 changes width at the same rate as Y2 310. In another embodiment of the invention, the rate of taper between Y1 320 and Y2 310 is different. In one embodiment of the invention, shape one 300B can be manufactured from a laminate comprising 20-micron (conventionally used for manufacture of Pico flexures) thick stainless steel and can be used in a Femto flexure. Shape one 300B, even when made from conventional laminate comprising 20 micron thick stainless steel provides the necessary pitch and roll stiffness while maintaining the correct lateral stiffness for Femto flexures.

FIG. 4 is a top view of a suspension comprising an exemplary flexure leg shape in accordance with embodiments of the present invention. In one embodiment of the invention, the flexure body 202 comprises a plurality of symmetrical flexure legs 222. In one embodiment of the invention, the flexure body 202 comprises two symmetrical flexure legs 222. In one embodiment of the invention, the flexure legs 222 are of shape one 300A of FIG. 3. In this embodiment of the invention, the flexure of shape one 300A comprises a first taper Y1 320, a second taper Y2 310 and a mid section of height H 330. In another embodiment of the invention, the flexure legs 222 are of shape two 300B of FIG. 3. In this embodiment of the invention, the flexure of shape one 300B comprises a first taper Y1 320, a second taper Y2 310 and a mid section of width W 340 and height H 330.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A head suspension assembly for a data storage device comprising:
   a load beam; and
   a Femto flexure coupled to said load beam, wherein said Femto flexure is a laminate structure comprising a support layer, said flexure comprising a plurality of symmetrical flexure legs, each of said flexure legs substantially hourglass shaped wherein one of said plurality of flexure legs comprises two symmetrical tapers that meet at a substantially rectangular mid section to form a narrowest point of said flexure leg.

2. The head suspension assembly as recited in claim 1 wherein said support layer comprises stainless steel or any other load bearing material such as copper.

3. The head suspension assembly as recited in claim 1 wherein one of said plurality of flexure legs comprises two symmetrical tapers that meet at said narrowest point of said flexure leg.

4. The head suspension assembly as recited in claim 1 wherein said flexure further comprises a conductive layer and an insulator layer.

5. The head suspension assembly as recited in claim 1 wherein said flexure reduces pitch and roll stiffness of said flexure while simultaneously maintaining lateral stiffness requirements of a Femto flexure.

6. A data recording disk drive comprising:
   a disk with a data surface of concentric data tracks;
   a rotator for rotating the disk about an axis generally perpendicular to the disk;
   a slider maintained in operative relationship with the data surface when the disk is rotating;
   a transducer attached to the slider for reading data from and writing data to the data surface;
   an actuator for moving the slider generally radially to the disk to allow the transducer to access the data tracks;
   an electronics module for processing data read from and written to the data surface; and
   a suspension comprising a Femto flexure, wherein said Femto flexure is a laminate structure comprising a support layer, said flexure comprising a plurality of symmetrical flexure legs, each of said flexure legs substantially hourglass shaped wherein one of said plurality of flexure legs comprises two symmetrical tapers that meet at a substantially rectangular mid section to form a narrowest point of said flexure leg.

7. The data recording disk drive as recited in claim 6 wherein said support layer comprises stainless steel or copper.

8. The data recording disk drive as recited in claim 6 wherein one of said plurality of flexure legs comprises two symmetrical tapers that meet at said narrowest point of said flexure leg.

9. The data recording disk drive as recited in claim 6 wherein said flexure further comprises a conductive layer and an insulator layer.

10. The data recording disk drive as recited in claim 6 wherein said flexure reduces pitch and roll stiffness of said flexure while simultaneously maintaining lateral stiffness requirements of a Femto flexure.

11. A Femto flexure for a data recording disk drive comprising:
    a laminate structure comprising a stainless steel or copper support layer; and
    a plurality of symmetrical flexure legs, each of said flexure legs substantially hourglass shaped wherein one of said plurality of flexure legs comprises two symmetrical tapers that meet at a substantially rectangular mid section to form a narrowest point of said flexure leg.

12. The Femto flexure as recited in claim 11 wherein said support layer comprises stainless steel.

13. The Femto flexure as recited in claim 11 wherein one of said plurality of flexure legs comprises two symmetrical tapers that meet at said narrowest point of said flexure leg.

14. The Femto flexure as recited in claim 11 wherein said flexure further comprises a conductive layer and an insulator layer.

15. The Femto flexure as recited in claim 11 wherein pitch and roll stiffness of said flexure is reduced while simultaneously lateral stiffness is maintained.

* * * * *